E. B. HELLER.
VACUUM CHURN.
APPLICATION FILED FEB. 18, 1914. RENEWED JUNE 19, 1916.
1,212,483.
Patented Jan. 16, 1917.
2 SHEETS—SHEET 1.
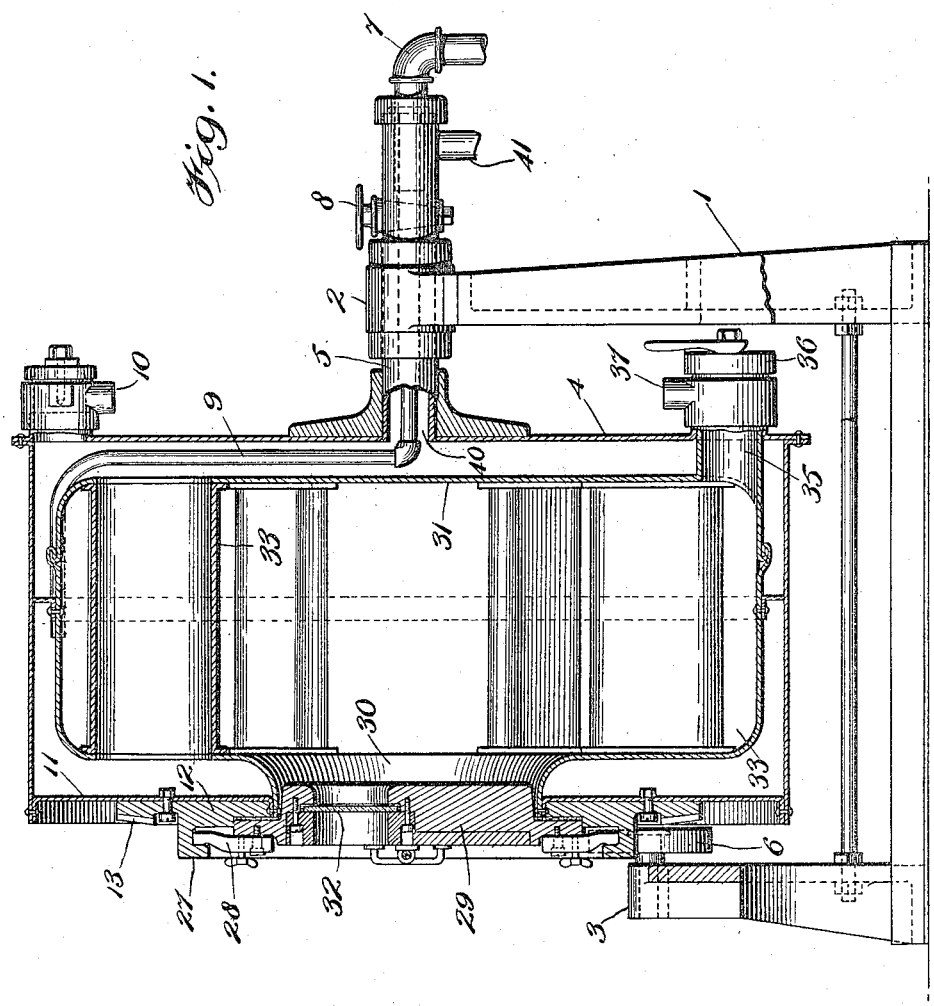

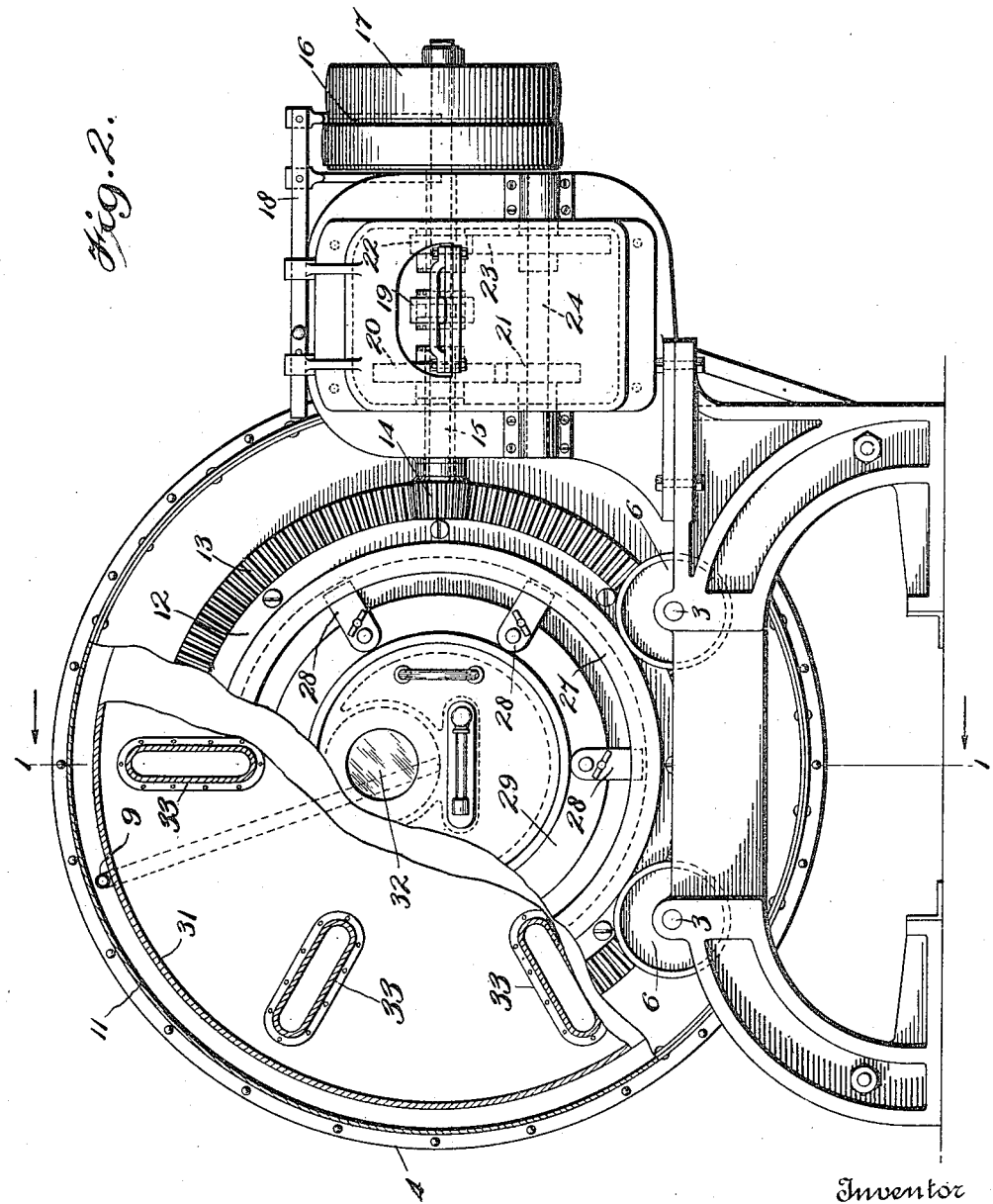

UNITED STATES PATENT OFFICE.

ERNEST B. HELLER, OF NEW YORK, N. Y., ASSIGNOR, BY MESNE ASSIGNMENTS, TO THE VACUUM CHURN CORPORATION, OF NEW YORK, N. Y., A CORPORATION OF NEW YORK.

VACUUM-CHURN.

1,212,483.     Specification of Letters Patent.     Patented Jan. 16, 1917.

Application filed February 18, 1914, Serial No. 819,443. Renewed June 19, 1916. Serial No. 104,571.

*To all whom it may concern:*

Be it known that I, ERNEST B. HELLER, a subject of the Emperor of Germany, residing at New York city, in the county of New York and State of New York, have invented certain new and useful Improvements in Vacuum-Churns; and I do hereby declare the following to be a full, clear, and exact description of the invention, such as will enable others skilled in the art to which it appertains to make and use the same.

This invention relates to churns, and has for its object to produce an apparatus which will be simple in construction, efficient in action, comparatively inexpensive to manufacture, and one that will enable the operator to pasteurize the cream as well as churn it without it being subjected to the atmosphere or to contact with the hand.

With these and other objects in view, the invention consists in the novel details of construction, and combinations of parts more fully hereinafter disclosed and particularly pointed out in the claims.

Referring to the accompanying drawings forming a part of this specification, in which like numerals designate like parts in all the views—Figure 1 is a sectional view of a churn made in accordance with my invention; and, Fig. 2 is an end elevational view, partly in section, of the parts shown in Fig. 1.

1 indicates any suitable framework provided with the bearings 2 and 3; 4, an outer casing supported on the hollow shaft 5 passing through the bearings 2, and also supported by the rollers 6 carried by the bearings 3. The hollow shaft 5 is connected with a steam-supply 7, controlled by a valve 8 and adapted to deliver steam into the casing or chamber 4 by means of the pipe 9. The said casing or chamber 4 is also provided with the connection 10, by means of which it may be pumped free of air or other gas. The said chamber 4 is further provided with an inwardly extending head 11 to which is fitted the casting 12 provided with the circular gear 13 with which meshes the pinion 14 carried by the shaft 15 on which are mounted the fast pulley 16 and the loose pulley 17. A belt shifter 18 is associated with the pulleys 16 and 17 and a clutch mechanism 19 is associated with said shaft 15 for the purpose of causing it to rotate at different speeds by means of the connection of the said clutch with the gears 20, 21, 22 and 23, as will be readily understood by those skilled in the art.

The gears 21 and 23 are mounted on a short stud shaft 24, as will be clear from Fig. 2. Rigid with the casting 12 is the annular member 27 adapted to receive the latches 28 carried by the cover 29 closing the opening 30 into the interior chamber or churn 31. The said cover 29 is provided with a side opening 32, as shown. The interior chamber or churn 31 is provided with a plurality of hollow dashers 33 extending through the walls of said chamber 31 as shown. These dashers as illustrated in Fig. 2, leave a space all around for the passage of the milk and thereby afford a chance for a maximum amount of milk to contact with their outer walls. The ends of these dashers 33 are also open to the chamber 4 as shown so that steam or hot water is afforded a free passage therethrough at all times and consequently if the said chamber 4 is kept at a given temperature, the surfaces of these dashers and therefore the contacting milk will be subjected to a constant temperature. This is an important feature of my invention, for in the making of high grade butters under vacuum processes it is of the greatest importance to know to just how high a temperature the cream is being subjected, and to also know for a certainty that this temperature in the cream has actually been reached. In addition to the above, my hollow dashers afford a greater surface in contact with the cream, and the output of the churn is greatly increased.

Leading from the inner chamber 31 is a passage 35 provided with a cover 36 and a nipple 37 adapted to connect with an air pump, for the purpose of exhausting the air from said chamber 31. I have discovered, as is disclosed in my copending application No. 686,915, filed March 28, 1912, and entitled machine for ripening dairy products, that it is possible to heat cream in a vacuum to a temperature which is sufficient to kill deleterious germs, but not sufficiently high to destroy the flavor of the butter.

Accordingly, I place cream in the inner chamber 31, exhaust the air through the connection 37, and then admit steam through the supply 7 to the outer chamber until the proper temperature has been reached to thoroughly pasteurize the cream in the chamber 31 and yet at the same time avoid heating the cream so high as to destroy its flavor. When the proper temperature has been reached as may be indicated on a thermometer, I then rotate both the inner and outer chambers on the bearings 2 and 3 until the cream is thoroughly churned. The side opening 32 enables the operator to watch the operation and to stop it when the butter has been made.

During the entire operation, no air is admitted to the cream or butter, and since it was thoroughly pasteurized after having been placed in the chamber 31 and securely sealed by the cover 29, the butter is produced with its natural flavor, and with no deleterious germs therein. Accordingly, it will keep for a very much longer time than will butter which has been exposed to the air after it has been made.

The passage 40 around the pipe 9 serves to permit the escape of the steam or hot water in the chamber 4, and the same may be drained off through the pipe 41.

It is obvious that those skilled in the art may vary the details of construction as well as the arrangement of parts without departing from the spirit of my invention and therefore I do not wish to be limited to the above disclosure except as may be required by the claims.

What I claim is:—

1. In a churn the combination of an outer sealed chamber; means to admit a fluid to said outer chamber; an inner sealed chamber; means to introduce cream into said inner chamber; hollow dashers located in said inner chamber and communicating with said outer chamber; means to exhaust the air from said inner chamber after the cream has been placed therein, and means to rotate said chambers, substantially as described.

2. In a churn the combination of an outer chamber; means to exhaust the air from said outer chamber; means to admit a fluid to said outer chamber; an inner chamber concentric with said outer chamber; means to exhaust the air from said inner chamber; means to introduce cream into said inner chamber; hollow dashers located in said inner chamber extending through the walls thereof and communicating with said outer chamber; and means to rotate said chambers, substantially as described.

In testimony whereof I affix my signature, in presence of two witnesses.

ERNEST B. HELLER.

Witnesses:
S. K. COHEN,
J. K. COHEN.

Copies of this patent may be obtained for five cents each, by addressing the "Commissioner of Patents, Washington, D. C."